United States Patent [19]

Foster

[11] Patent Number: 4,624,055

[45] Date of Patent: Nov. 25, 1986

[54] CONSECUTIVE READING GAUGING BOB

[75] Inventor: Don M. Foster, Florissant, Colo.

[73] Assignee: Fostco, Inc., Florissant, Colo.

[21] Appl. No.: 745,938

[22] Filed: Jun. 18, 1985

[51] Int. Cl.⁴ .......................... G01B 3/00; G01F 23/04
[52] U.S. Cl. .................................................. 33/126.5
[58] Field of Search ........................... 33/126.5, 126.6

[56] References Cited

U.S. PATENT DOCUMENTS

| | | | |
|---|---|---|---|
| 2,006,301 | 6/1935 | Meyer | 33/126.5 |
| 2,157,024 | 5/1939 | Smith | 33/126.5 |
| 2,539,925 | 1/1951 | Quist | 33/126.5 |
| 2,561,662 | 7/1951 | Johnson | 33/126.5 |
| 2,580,320 | 12/1951 | Quist | 33/126.5 |
| 2,779,045 | 1/1957 | Harvey | 33/126.5 |
| 2,856,690 | 10/1958 | MacDonald | 33/126.5 |
| 3,396,470 | 8/1968 | Wood | 33/126.5 |

Primary Examiner—Richard R. Stearns
Attorney, Agent, or Firm—Neal J. Mosely

[57] ABSTRACT

A tank gauging bob is adapted to be releasably attached to a measuring tape for measuring the contents of a storage compartment. The bob comprises a generally cylindrical vertical elongated body having a measuring tape receiving lug and an extended portion which overlaps the lower portion of the tape and the point of attachment of the bob to the tape. The body and extended portion possess graduations on their outer surface whereby when the tape is attached to the body, the graduations form a continious consecutive reading scale with the measuring tape.

24 Claims, 6 Drawing Figures

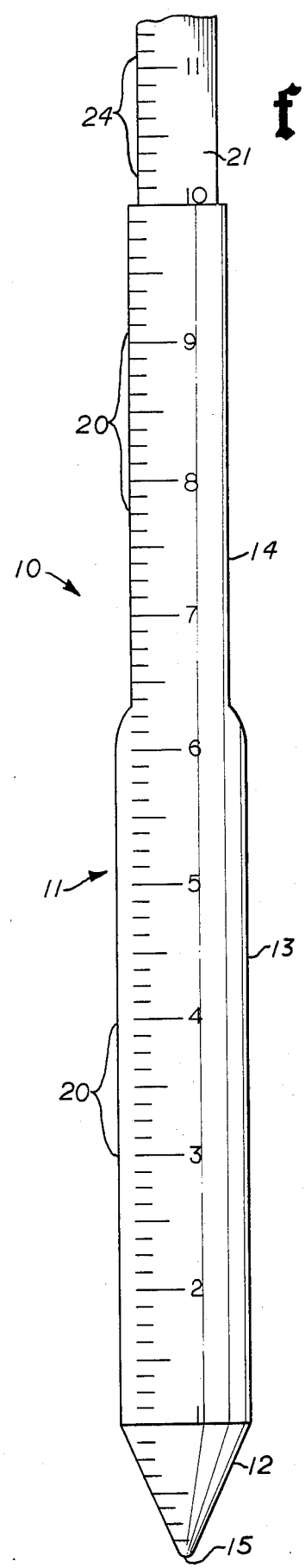
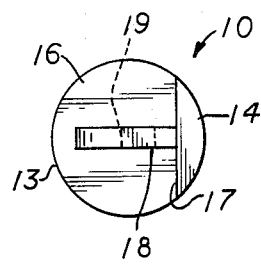
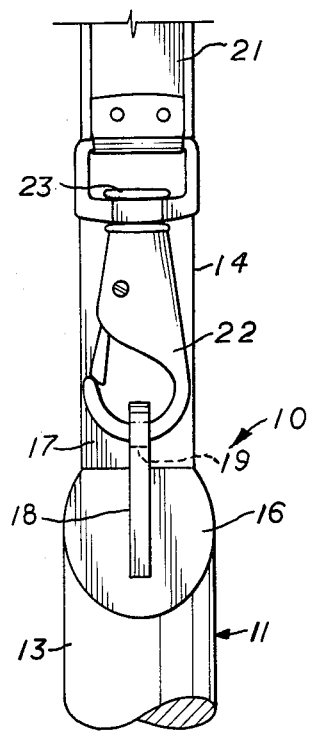
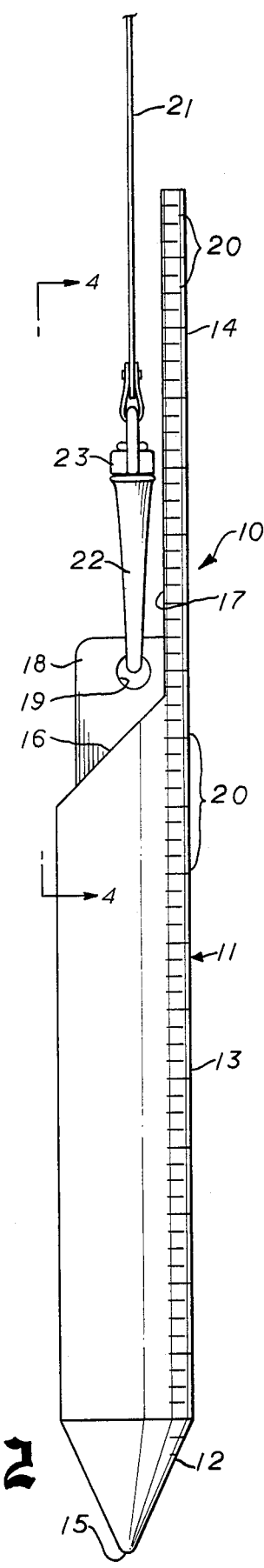
fig.1
fig.3
fig.4
fig.2

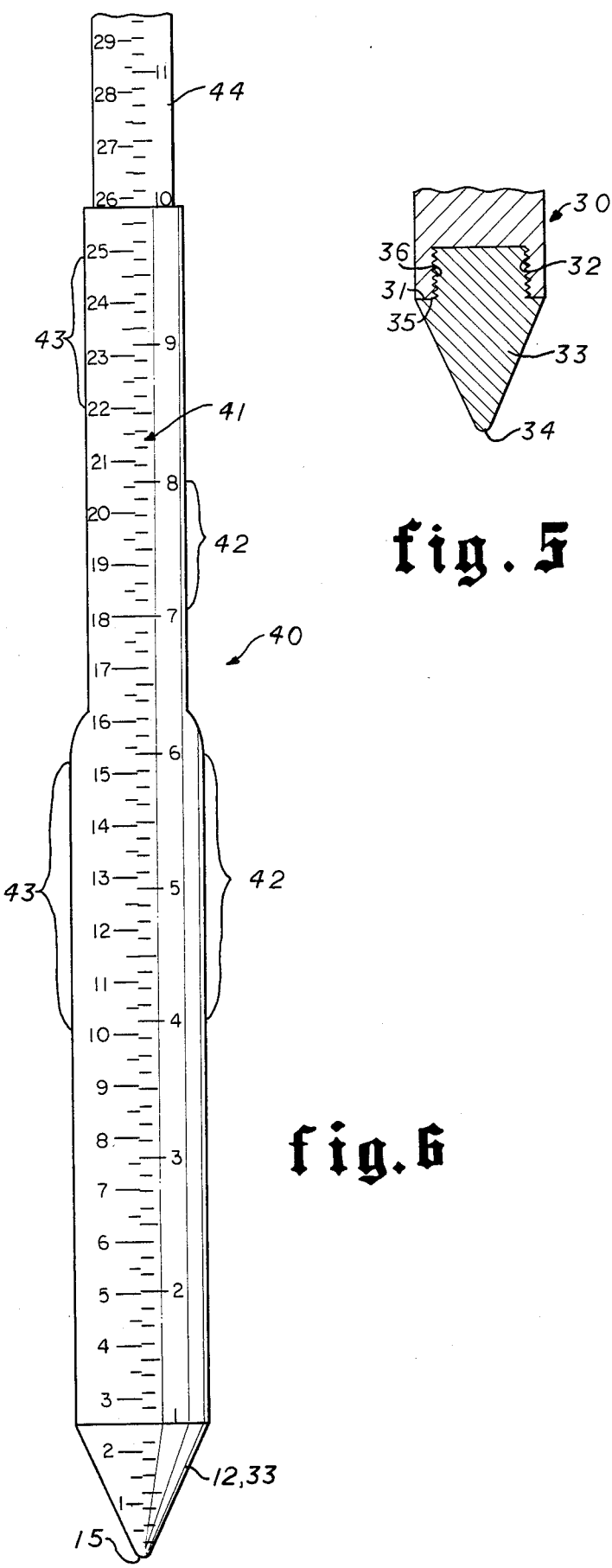

CONSECUTIVE READING GAUGING BOB

BACKGROUND OF THE INVENTION

1. Field of the Invention

This invention relates generally to gauging devices used in determining the amount of liquid in large tanks, and more particularly to a bob with an extended tail portion having exact tape measure graduations which when connected to the measuring tape will overlap the connection to provide consecutive continious and coincident measurement graduations.

2. Brief Description of the Prior Art

In many industries it is necessary to maintain large quantities of liquid material in storage prior to processing or distribution. This is particularly true of the petroleum industry in the oil fields, at the refineries, and at the distribution points. These liquid petroleum stocks are stored in large tanks which may be of thousands of gallons capacity. It is important in the operation of this industry that the quantity of material within these tanks be known with a reasonable degree of accuracy. This information has been furnished in the prior art by dropping a plumb bob on the end of a scale tape into the tank to determine the height of liquid therein. Knowing the physical dimensions of the tank, the quantity of liquid can be calculated by simple mathematics.

In some cases, it is expedient to drop the bob to the bottom of the tank and read the tape at the point where the wetting stops. For this purpose an innage bob is used inasmuch as the result is the amount of material in the tank. In other cases, however, it is more expeditious to drop the bob to the surface of the liquid and determine the distance from the top of the tank to the surface of the liquid. For this purpose an outage bob is used, the result being the amount of material that can be accommodated in that tank. This value can be subtracted from the known total capacity of the tank to determine the amount of liquid in the tank.

In tanks of this type, water is continually condensed from the air above the liquid within the tank because of the fluctuating air temperature. The water accumulates on the bottom of the tank and in layers near the bottom. The water layers may range from a fraction of an inch to several inches in thickness. In order to determine accurately the amount of product or stock in the tank, the quantity of water must be determined and this subtracted from the calculated amount of oil obtained by using an innage or outage bob, as hereinbefore indicated. It is very important that the amount of water is measured precisely. Even a small layer of water in a large tank or several tanks being inventoried for subsequent sale may reduce the actual volume of product being bought or sold by several thousands of barrels, resulting in substantial amounts of money in negotiating the sale.

In order to precisely determine location and thickness of the water layer, several chalks, paints, and pastes have been used to paint or cover the innage bob and lower end of the scale. The paint or chalk is brought into contact with the water when the innage bob is lowered to the bottom of the tank. The chalk, paint or paste is removed by water, or its color is changed, whereas the chalk, paint or paste is unaffected by the petroleum stock above the water. Thus the water level and quantity is readily determined at the same time that the product or stock height is taken.

Common bobs used in the above proceedure usually comprise a cylindrical brass bob six inches long which has a pointed bottom end and a flat top end with a perforated lug on the top or cap of the plumb bob for engagement with a swivel snap hook secured to the lower end of the tape. Bobs of this type are unsatisfactory for several reasons. For example, there is a critical area about the point of attachment where no readings can be taken directly because no calibrations are provided. The critical area extends from approximately the six inch to the eight inch calibrations. If the water level occurs in that region, the precise water level and thickness must be estimated, or a scale must be placed alongside the bob and tape to obtain the water reading. As another example, the bob tends to oscillate on the end of the scale causing the scale readings on the bob to be out of alignment with the scale readings on the tape. This tends to make it more difficult to find the water reading when the bob is removed from the tank.

There are several patents which disclose bobs designed to overcome the aforementioned problems.

Quist, U.S. Pat. No. 2,539,925 discloses an outgage bob of rectangular cross-section having an extended top portion provided with a laterally extending hook which receives a ring attached to the end of the tape measure. A spring clip secured to the body of the bob in operating engagement with the hook retains the ring on the hook. The ring is dimensioned to exactly extend the tape graduations whereby the graduations of the bob and tape are in exact prolongation of each other.

Quist, U.S. Pat. No. 2,580,320 discloses a liquid surface sensing bob comprising a hollow cylindrical body with a conical weighted section at the bottom. The body is filled with a discrete filler of low specific gravity and high reinforcing strength such as foam glass to maintain the shape of the bob under pressure. The bob in its preferred form has graduations from the juncture of the cylinder wall with the conical weighted section, and a flexible extension having a hook snap to which the ring of the measuring tape is attached. There is no provision for consecutive graduations about the point of attachment.

Johnson, U.S. Pat. No. 2,561,662 discloses a tank reading bob comprising an elongated body, a generally pointed cap, and a similar shaped base. The body is preferrably of square cross-section and has a hollow center of circular cross-section. The cap and base members are inserted into each open end of the body and locked into place by lock screws. The cap has a vertical slot which passes through it and extends through one side, and the upper end of the body has a similar slot with a transverse hole located at the bottom of the slot. The cap is rotated until the slots register and a tape measure is inserted therethrough into the bob and secured by a pin. After the tape has been secured, the cap is rotated so that the slots are out of alignment. Graduations are located on the outside of the base, body, and cap so that when the cap is rotated to lock the tape in the bob, the graduations form a continious-reading scale.

McDonald, U.S. Pat. No. 2,856,690 discloses a combination innage and outage liquid level gauge having a housing with a channel which receives an extensable slide. A lug extends from the housing for connecting the gauge to a measuring tape. There is no provision for consecutive graduations about the point of attachment.

Lewis, U.S. Pat. No. 1,680,297 discloses a plumb bob adapted for use with a metallic tape comprising a body formed in the shape of a frustrum of a cone split along its longitudinal center line into two portions having recesses to receive the tape. The two portions are fastened together around the tape by spring clips.

The prior art in general, and these patents in particular, does not disclose the present invention of a tank gauging bob adapted to be releasably attached to a measuring tape which comprises a generally cylindrical vertical elongated body having a measuring tape receiving lug and an extended portion which overlaps the lower portion of the tape and the point of attachment of the bob to the tape. The body and extended portion possessing graduations on their outer surface whereby when the tape is attached to the body, the graduations form a continious consecutive reading scale with the measuring tape.

SUMMARY OF THE INVENTION

It is therefore an object of the present invention to provide a tank gauging device which would read continuously along the length of the bob and scale.

Another object of this invention is to provide a tank gauging device for use in measuring the water and petroleum liquid levels in supply and storage tanks which could be readily and easily connected to and disconnected from a tape scale.

Another object of this invention is to provide a tank gauging device on which the scale markings on the bob may be easily and positively aligned with the scale readings on the tape, enabling the operator to quickly find the reading.

Another object of this invention is to provide a tank gauging device which is conveniently and easily connected and disconnected from the tape after a reading has been taken in order to apply the paint or chalk for the next reading and for carrying it from one tank to another. Other objects of the invention will become apparent from time to time throughout the specification and claims as hereinafter related.

The above noted objects and other objects of the invention are accomplished by a tank gauging bob adapted to be releasably attached to a measuring tape which comprises a generally cylindrical vertical elongated body having a measuring tape receiving lug and an extended portion which overlaps the lower portion of the tape and the point of attachment of the bob to the tape. The body and extended portion possessing graduations on their outer surface whereby when the tape is attached to the body, the graduations form a continious consecutive reading scale with the measuring tape.

BRIEF DESCRIPTION OF THE DRAWINGS

FIG. 1 is a vertical elevation of the front of the innage bob in accordance with the present invention attached to a tape measure.

FIG. 2 is a vertical elevation of the side of the innage bob attached to a tape measure.

FIG. 3 is a top plan view of the bob with the tape measure removed.

FIG. 4 is a partial vertical elevation of the back of the bob showing how the tape measure is attached.

FIG. 5 is a partial vertical elevation of the bottom portion of a modified innage bob having a removable tip member.

FIG. 6 is a vertical elevation of a modified innage bob having corresponding dual graduations.

DESCRIPTION OF THE PREFERRED EMBODIMENT

Referring to the drawings by numerals of reference, the innage bob 10, comprises an elongated generally cylindrical body 11 having a conical bottom portion or tip 12, a cylindrical intermediate portion 13, and an extended upper portion 14. The body 11 may be of any suitable cross-section, however, a circular cross-section is preferred. The tip 12 has a rounded apex 15 to prevent inaccurate graduations as the tip becomes worn after repeated use.

The extended portion 14 is semi-circular in cross section, and a beveled surface 16 extends angularly from the cylindrical intermediate portion 13 to the flat surface 17 on the back side of the extended upper portion 14. A flat lug 18 having a transverse hole 19 therethrough extends upwardly from the beveled surface 16 and outwardly from the flat surface 17.

Graduations 20 are suitably located on the outside of the conical tip 12, cylindrical intermediate portion 13, and extended upper portion 14, starting from zero at the bottom of the tip and ending with ten at the top of the extended portion. The appropriate graduations on the tapered side of the tip 12 are spaced to read correctly when viewed horizontally. A conventional innage measuring tape 21 having a snap hook 22 rotatably secured at its bottom end by a swivel connection 23 is releasably attached to the lug 18 through the hole 19. The hole 19 is located relative to the central longitudinal axis of the body so that the bob 10 will be suspended in a balanced vertical position.

The innage tape 21 is provided with graduations 24 on its outer surface which correspond to the graduations on the extended portion 14 of the bob. The graduations 24 of the tape 21 are made so that when the bob 10 is totated to a reading position with the tape directly behind the flat surface 17 of the extended portion, the graduations 20 of the bob and the graduations 24 of the tape 21 register in alignment to form a continuous-reading scale.

FIG. 5 shows a modified bob wherein the bottom of the cylindrical intermediate portion 30 is provided with a flat bottom surface 31 and internal threads 32 extending inwardly therefrom. A conical tip 33 has a rounded apex 34 and tapered sides which extend upwardly to terminate at a flat circumferential shoulder 35. The top of the tip 33 is reduced in diameter and provided with external threads 36 which are received in the threads 32 of the body.

As previously described but not shown here, graduations are located on the outside of the conical tip 33, cylindrical intermediate portion 30, and extended upper portion, starting from zero at the bottom of the tip and ending with ten at the top of the extended portion. The appropriate graduations on the tapered side of the tip 33 are spaced to read consecutively with the intermediate portion and correctly when viewed horizontally. The rounded apex 34 prevents inaccurate graduations as the tip becomes worn, and after repeated use the the tip may simply be unscrewed and replaced with a new tip.

FIG. 6 shows another modified bob 40 having a dual reading scale 41. The other components of the bob are the same as previously described, and will not be repeated here to avoid repetition. It should be understood that the bob 40 may be provided with the integral tip portion 12 or the replaceable tip 33 as previously described. The scale 41 as illustrated is provided with graduations 42 on one side which are in inches and a laterally opposed scale on the other side having the exact corresponding metric equivelent.

Graduations 20 are suitably located on the outside of the conical tip 12, cylindrical intermediate portion 13, and extended upper portion 14, starting from zero at the bottom of the tip and ending with ten at the top of the extended portion. The appropriate graduations on the tapered side of the tip 12 are spaced to read correctly when viewed horizontally.

A conventional innage measuring tape is provided with a corresponding scale 44 having graduations on its outer surface which correspond to the graduations on the extended portion of the bob. The scale 44 may be in either or both the inch and metric measuring system. The graduations of the tape are made so that when the bob is rotated to a reading position with the tape directly behind the flat surface of the extended portion, the graduations of the bob and the graduations of the tape register in alignment to form a continuous-reading scale.

The body 10 of these bobs can be made of soft material, for example, brass or a soft bronze. Because the bobs are sometimes brought into hard contact with the metal portions of the tank during the gauging operations, it is desirable that they be cnstructed of non-sparking material to provide for greater safety when gauging inflammable materials. The bobs or tips may be made of soft bronze or brass, or a hardened material, such as beryllium bronze.

OPERATION

Liquid petroleum stocks are stored in large tanks which may be of thousands of gallons capacity prior to processing or distribution. It is important in the operation of this industry, and particularly in negotiating the purchase or sale of the liquid product, that the precise quantity of material within these tanks be known. Knowing the physical dimensions of the tank, the quantity of liquid can be calculated by simple mathematics.

In tanks of this type, water is continually condensed from the air above the liquid within the tank because of the fluctuating air temperature. The water accumulates on the bottom of the tank and in layers near the bottom. The water layers may range from a fraction of an inch to several inches in thickness. In order to determine accurately the amount of product or stock in the tank, the quantity of water must be determined and this subtracted from the calculated amount of oil obtained by using an innage or outage bob, as hereinbefore indicated. It is very important that the amount of water is measured precisely. Even a small layer of water in a large tank or several tanks being inventoried for subsequent sale may reduce the actual volume of product being bought or sold by several thousands of barrels, resulting in substantial amounts of money in negotiating the sale.

For this purpose, an innage reading is taken wherein the innage bob is attached to the snap hook at the end of the measuring tape and dropped to the bottom of the tank. The tape is read at the point where the wetting stops.

In order to precisely determine the location and thickness of the water layer, a suitable chalks, paint, or paste is used to paint or cover the innage bob and lower end of the tape scale. The paint of chalk is brought into contact with the water layer when the innage bob is lowered to the bottom of the tank. The chalk, paint or paste is removed by water, or its color is changed, whereas the chalk, paint or paste is unaffected by the petroleum stock above the water. Thus the water level and quantity is readily determined at the same time that the product or stock height is taken, and this subtracted from the calculated amount of oil.

The bob in accordance with the present invention provides for continious calibrations at the point of attachment of the bob to the tape in the region where the water layer often occurs.

The bob is also quickly and easily disconnected and connected to the tape. For example, it is convenient to disconnect the bob, after a reading has been taken, in order to apply the paint or chalk for the next reading. As another example, it may be desired to disconnect the bob from the scale while carrying it from one tank to another to prevent the thin steel tape from becoming bent by the weight of the bob if carried improperly or stored improperly.

While this invention has been described fully and completely with special emphasis upon a preferred embodiment, it should be understood that within the scope of the appended claims the invention may be practiced otherwise than as specifically described herein.

I claim:

1. A continuous reading gauging bob releasably attachable to a measuring tape having graduations for measuring the contents of a storage compartment comprising
   a generally cylindrical vertical elongated body having a measuring tape receiving means and an extended upper portion which overlaps the lower portion of the tape and the point of attachment of the bob thereto,
   said tape receiving means comprising a projecting body portion having an aperture adapted to receive a snap hook secured on the bottom end of a measuring tape by a swivel connection for rotatably supporting said bob, and
   graduations on the outer surface of said body and extended upper portion spaced relative to the graduations of the tape to form a continuous consecutive reading scale with the measuring tape when attached thereto.

2. A continuous reading gauging bob according to claim 1 wherein
   said body comprises a cylindrical intermediate portion, a conical bottom portion depending therefrom,
   said extended upper portion semi-circular in cross section, and
   a beveled surface extending angularly from the cylindrical intermediate portion to the back side of the extended upper portion.

3. A continuous reading gauging bob according to claim 2 wherein
   said tape receiving means comprises a flat lug extended upwardly from said beveled surface and outwardly from the back side of said extended upper portion and provided with an aperture extending transversly therethrough,
   said aperture located relative to the longitudinal axis of said body to suspend said bob in a balanced vertical position when attached to said tape with said graduations of said extended upper portion in registration with said graduations of said tape.

4. A continuous reading gauging bob according to claim 2 wherein said graduations are located on the outside surface of said conical tip, cylindrical intermediate portion, and extended upper portion.

5. A continuous reading gauging bob according to claim 2 wherein
said graduations on the outside surface of said conical bottom portion are spaced to read correctly and consecutively with said graduations on said intermediate portion when viewed horizontally.

6. A continuous reading gauging bob according to claim 2 wherein
said conical bottom portion is removably connected to said intermediate portion.

7. A continuous reading gauging bob according to claim 2 wherein said conical bottom portion has a rounded apex.

8. A continuous reading gauging bob according to claim 1 wherein
said graduations on the outer surface of said body and extended upper portion comprise a first set of graduations in increments of one measuring system and a second laterally opposed set of graduations in increments of another corresponding measuring system.

9. In combination with a measuring tape having graduations for measuring the contents of a storage compartment a continuous reading gauging bob releasably attachable thereto comprising
a generally cylindrical vertical elongated body having a measuring tape receiving means and an extended upper portion which overlaps the lower portion of the tape and the point of attachment of the bob thereto, and
graduations on the outer surface of said body and extended upper portion spaced relative to the graduations of the tape to form a continuous consecutive reading scale with the measuring tape when attached thereto,
said measuring tape provided with a snap hook rotatably secured at its bottom end by a swivel connection, and said bob rotatably attached thereto.

10. The combination according to claim 9 wherein
said body comprises a cylindrical intermediate portion, a conical bottom portion depending therefrom,
said extended upper portion semi-circular in cross section, and
a beveled surface extending angularly from the cylindrical intermediate portion to the back side of the extended upper portion.

11. The combination according to claim 10 wherein
said tape receiving means comprises a flat lug extended upwardly from said beveled surface and outwardly from the back side of said extended upper portion and provided with an aperture extending transversely therethrough,
said aperture located relative to the longitudinal axis of said body to suspend said bob in a balanced vertical position when attached to said tape with said graduations of said extended upper portion in registration with said graduations of said tape.

12. The combination according to claim 10 wherein
said graduations are located on the outside surface of said conical tip, cylindrical intermediate portion, and extended upper portion.

13. The combination according to claim 10 wherein
said graduations on the outside surface of said conical bottom portion are spaced to read correctly and consecutively with said graduations on said intermediate portion when viewed horizontally.

14. The combination according to claim 10 wherein
said conical bottom portion is removably connected to said intermediate portion.

15. The combination according to claim 10 wherein said conical bottom portion has a rounded apex.

16. The combination according to claim 9 wherein
said graduations on the outer surface of said body and extended upper portion comprise a first set of graduations in increments of one measuring system and a second laterally opposed set of graduations in increments of another corresponding measuring system.

17. In combination with a storage tank for holding liquids a continuous reading apparatus comprising;
a measuring tape having graduations for measuring the contents of a storage compartment,
a continuous reading gauging bob releasably attachable to said tape comprising
a generally cylindrical vertical elongated body having a measuring tape receiving means and an extended upper portion which overlaps the lower portion of the tape and the point of attachment of the bob thereto, and
graduations on the outer surface of said body and extended upper portion spaced relative to the graduations of the tape to form a continuous consecutive reading scale with the measuring tape when attached thereto,
said measuring tape provided with a snap hook rotatably secured at its bottom end by a swivel connection, and said bob rotatably attached thereto.

18. The combination according to claim 17 wherein
said body comprises a cylindrical intermediate portion, a conical bottom portion depending therefrom,
said extended upper portion semi-circular in cross section, and
a beveled surface extending angularly from the cylindrical intermediate portion to the back side of the extended upper portion.

19. The combination according to claim 18 wherein
said tape receiving means comprises a flat lug extended upwardly from said beveled surface and outwardly from the back side of said extended upper portion and provided with an aperture extending transversly therethrough,
said aperture located relative to the longitudinal axis of said body to suspend said bob in a balanced vertical position when attached to said tape with said graduations of said extended upper portion in registration with said graduations of said tape.

20. The combination according to claim 18 wherein
said graduations are located on the outside surface of said conical tip, cylindrical intermediate portion, and extended upper portion.

21. The combination according to claim 18 wherein
said graduations on the outside surface of said conical bottom portion are spaced to read correctly and consecutively with said graduations on said intermediate portion when viewed horizontally.

22. The combination according to claim 18 wherein
said conical bottom portion is removably connected to said intermediate portion.

23. The combination according to claim 18 wherein said conical bottom portion has a rounded apex.

24. The combination according to claim 17 wherein
said graduations on the outer surface of said body and extended upper portion comprise a first set of graduations in increments of one measuring system and a second laterally opposed set of graduations in increments of another corresponding measuring system.

* * * * *